(12) United States Patent
Robertson et al.

(10) Patent No.: US 8,514,855 B1
(45) Date of Patent: Aug. 20, 2013

(54) EXTENSIBLE PACKET PROCESSING ARCHITECTURE

(75) Inventors: Perry J. Robertson, Albuquerque, NM (US); Jason R. Hamlet, Albuquerque, NM (US); Lyndon G. Pierson, Albuquerque, NM (US); Ronald R. Olsberg, Albuquerque, NM (US); Guy D. Chun, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 456 days.

(21) Appl. No.: 12/773,120

(22) Filed: May 4, 2010

(51) Int. Cl.
*H04L 12/28* (2006.01)

(52) U.S. Cl.
USPC .......................................................... 370/389

(58) Field of Classification Search
USPC ......................................... 370/389, 392, 394
See application file for complete search history.

(56) References Cited

U.S. PATENT DOCUMENTS

| | | | | |
|---|---|---|---|---|
| 4,571,672 A * | 2/1986 | Hatada et al. | ................. | 711/152 |
| 6,212,589 B1 * | 4/2001 | Hayek et al. | .................. | 710/119 |
| 7,177,421 B2 * | 2/2007 | Buer et al. | ...................... | 380/28 |
| 7,692,561 B2 * | 4/2010 | Biran et al. | ..................... | 341/51 |
| 7,746,862 B1 * | 6/2010 | Zuk et al. | ...................... | 370/392 |
| 2003/0233503 A1 * | 12/2003 | Yang et al. | ..................... | 710/100 |
| 2008/0225863 A1 * | 9/2008 | Arimilli et al. | ............... | 370/400 |

* cited by examiner

*Primary Examiner* — Mark Rinehart
*Assistant Examiner* — Mohammad Anwar
(74) *Attorney, Agent, or Firm* — Cory G. Claassen (57) ABSTRACT

A technique for distributed packet processing includes sequentially passing packets associated with packet flows between a plurality of processing engines along a flow through data bus linking the plurality of processing engines in series. At least one packet within a given packet flow is marked by a given processing engine to signify by the given processing engine to the other processing engines that the given processing engine has claimed the given packet flow for processing. A processing function is applied to each of the packet flows within the processing engines and the processed packets are output on a time-shared, arbitered data bus coupled to the plurality of processing engines.

21 Claims, 6 Drawing Sheets

EXTENSIBLE PACKET PROCESSING ARCHITECTURE

STATEMENT REGARDING FEDERALLY SPONSORED RESEARCH

This invention was developed with Government support under Contract No. DE-AC04-94AL85000 between Sandia Corporation and the U.S. Department of Energy. The U.S. Government has certain rights in this invention.

TECHNICAL FIELD

This disclosure relates generally to computer networks, and in particular but not exclusively, relates to a packet processor architecture.

BACKGROUND INFORMATION

The Internet is becoming a fundamental tool used in our personal and professional lives on a daily basis. As such, the bandwidth demands placed on network elements that underpin the Internet are rapidly increasing. In order to feed the seemingly insatiable hunger for bandwidth, parallel processing techniques have been developed to scale compute power in a cost effective manner. Effective parallel processing techniques must be capable of scaling in order to keep up with ever increasing network line rates.

However, scalable processing techniques often introduce a variety of complexities related to effective sharing of limited resources. One such complexity is to ensure that all available compute resources in the distributed compute environment are efficiently shared and effectively deployed. Ensuring efficient sharing of distributed resources requires scheduling workloads amongst the distributed resources in an intelligent manner so as to avoid situations where some resources are overburdened, while others lay idle. A common situation of which parallel processing techniques or distributed compute environments fall victim, is head-of-line blockages. Head-of-line blockages occur when an upstream compute component is overburdened resulting in a compute blockage or bottleneck, while downstream compute components remain underutilized or even idle waiting for their turn in a processing pipeline. An effective parallel processing architecture should seek to deliver adequate compute resources in a scalable manner, while avoiding head-of-line blockages.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of an apparatus and method for operation of extensible processing pipeline are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. "Packet flow" is defined herein as a stream of related packets flowing through a network node. The related packets include common attributes, such as for example, a common 5-tuple source address, destination address, transport protocol number, source port, and destination port. Other common attribute fields may be used to characterize a packet flow.

Figure 1:
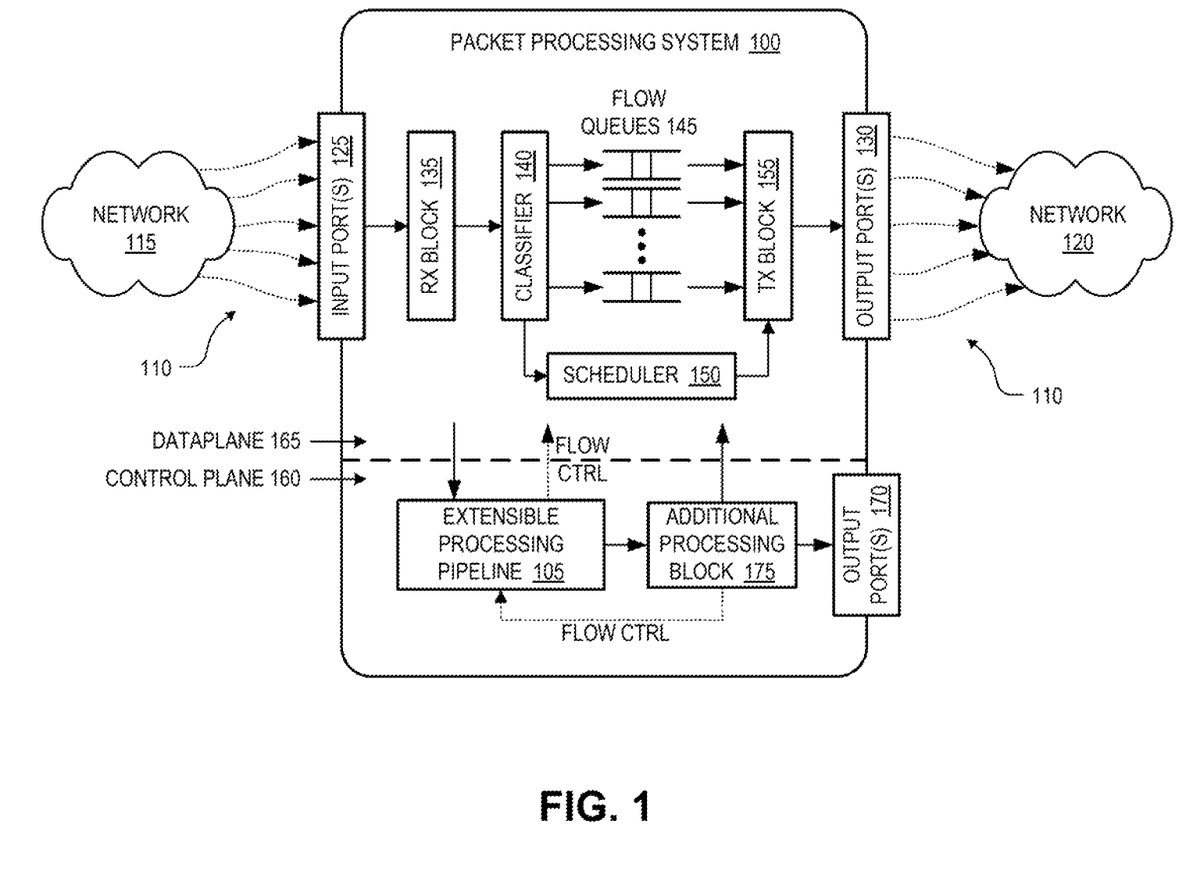
FIG. 1 is a functional block diagram of a packet processing system with extensible processing pipeline, in accordance with an embodiment of the invention.

FIG. 1 is a functional block diagram of a packet processing system 100 including an extensible processing pipeline 105, in accordance with an embodiment of the invention. The illustrated embodiment of packet processing system 100 represent a network appliance or network system for processing packet flows 110 flowing through the packet processing system 100 between networks 115 and 120. For the sake of clarity and so as not to clutter the drawings, FIG. 1 illustrates packet processing system 100 as processing unidirectional packet flows received at input ports 125 and transmitted from output ports 130; however, it should be appreciated that both input and output ports 125 and 130 may be bi-directional ports for forwarding packets through packet processing system 100 in both directions.

As packet flows 110 are received at input ports 125, receive block 135 receives the packets and temporarily buffers them until classifier 140 is able to classify packet flows 110 into flow queues 145. Packet flows 110 may be classified into flow queues based upon a variety of characteristics, as discussed below. The packets of each packet flow 110 remain temporarily queued until scheduler 150 schedules a time slot for each packet to be dequeued and output on output ports 130 by transmit block 155.

As previously mentioned, packet flows 110 may be classified into different flow queues 145 based on a variety of factors, such as, source, destination, quality of service, and the like. Furthermore, some packet flows 110 may be classified into a flow queue 145 identified as requiring additional or control plane processing. These additional processing required packets may be classified into designated flow queues 145 that divert a copy of the packets to control plane 160 of packet processing system 100 for additional or deep packet analysis ("DPA").

Within control plane 160, the diverted packet copies are fed into an extensible processing pipeline 105 to perform the additional packet processing. Extensible processing pipeline 105 represents an extensible or scalable processing architecture capable of processing large volumes of packets at or near line rates. The output results or processed packets of extensible processing pipeline 105 may be routed back up to dataplane 165 to be forwarded out output ports 130 by transmit block 130, routed out along control plane output ports 170, or forwarded to an additional processing block 175 within packet processing system 100 before being forwarded up to dataplane 165 or out output ports 170. The architecture of extensible processing pipeline 105 may be used to apply a variety of functions on packet flows 110. For example, classifier 140 may identify all packet flows 110 carrying payload data or application level data that is compressed (e.g., compressed using the deflate compression algorithm). Copies of these compressed data packets may then be routed through extensible processing pipeline 105 for expansion or decompression and then the decompressed data packets forwarded through additional processing block 175 for DPA.

Figure 2:
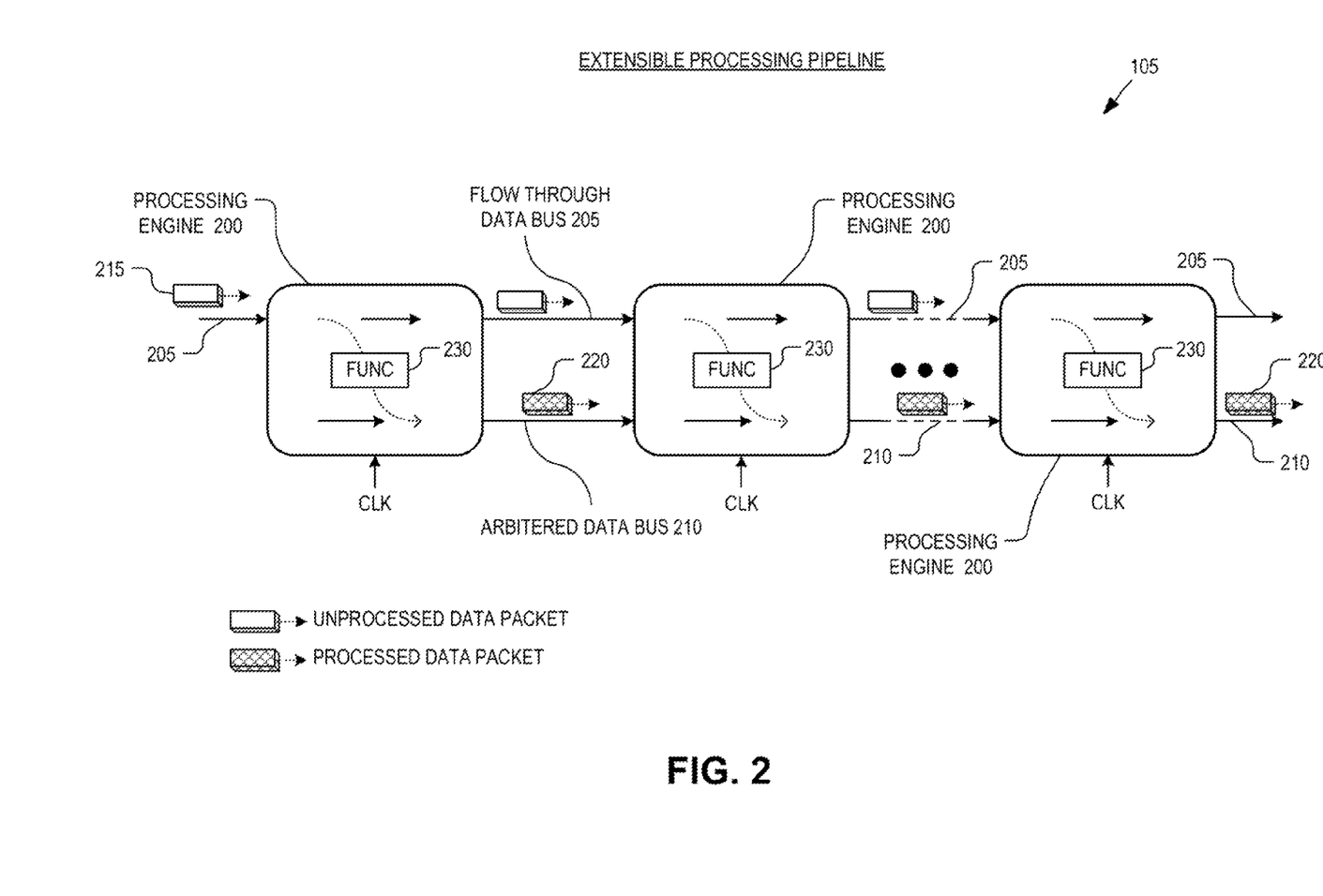
FIG. 2 is a functional block diagram of the extensible processing pipeline including a plurality of serially linkable processing engines, in accordance with an embodiment of the invention.

FIG. 2 is a functional block diagram illustrating extensible processing pipeline 105, in accordance with an embodiment of the invention. The illustrated embodiment of extensible processing pipeline 105 includes a plurality of processing engines ("PEs") 200 linked in series via a flow through data bus 205 and an arbitered data bus 210. Although FIG. 2 illustrates three serially linked PEs 200, it should be appreciated that any number of PEs 200 may be linked in series. Furthermore, FIG. 2 arbitrarily illustrates dataflow moving left to right along flow through data bus 205 and arbitered data bus 210; however, it should be appreciated that either one or both buses 205 and 210 may flow data left to right or right to left and the two buses need not flow in the same direction.

Unprocessed data packets 215 are received on flow through data bus 205 at the leftmost PE 200 and are passed sequentially along flow through data bus 205 to the rightmost PE 200. At each PE 200, unprocessed data packets 215 are temporarily buffered and inspected for a flag indicating whether the packet (and by implication the entire packet flow of which the packet is a member) has been claimed by another one of PEs 200: If the packet has not been claimed and the given PE 200 is available (e.g., not currently working on another packet flow), then the given PE 200 claims the packet by marking it with a flag before passing the packet along to the next PE 200. If the unprocessed data packet 215 has already been claimed, then the given PE 200 passes it along and flushes its buffer. Upon arrival of an unprocessed data packet 215 that is a member of a packet flow already claimed by a given PE 200, the given PE 200 buffers a copy, passes along a copy on flow through data bus 205, applies its function engine 230 to its buffered copy, and outputs a processed data packet 220 on arbitered data bus 210. Each PE 200 includes a distributed arbiter capable of making decentralized decisions for time sharing arbitered data bus 210. In one embodiment, the distributed arbiters internal to PEs 200 pass a virtual baton along forward and reverse paths. Whichever PE 200 is currently holding the virtual baton is given write permission to output a processed data packet 220 on arbitered data bus 210.

Since PEs 200 use flow through data bus 205 to mark and/or pass unprocessed data packets 215 in one direction and use decentralized decisions to share arbitered data bus 210, PEs 200 need not be aware of how many PEs are linked in series; rather, each PE 200 is merely aware of its relative location along extensible processing pipeline 105—whether it is the first or leftmost PE in the chain, an intermediate PE in the chain, or the last or rightmost PE in the chain. These features enable extensible processing pipeline 105 to be easily extended, providing scalability by linking additional PEs 200 to extensible processing pipeline 105. Since each PE 200 claims a packet flow when one is available, extensible processing pipeline 105 can process up to N number of packets associated with N different packet flows in parallel by linking N PEs 200 in series. To increase the parallel processing capabilities of extensible processing pipeline 105, additional PEs 200 can simply be added to an existing implementation. Groups of N PEs 200 may be integrated on to a single semiconductor die (e.g., ASIC), field programmable gate array ("FPGA"), circuit board, or other hardware/software implementation, while an unlimited number of these implementations may be linked together to provide increasing parallel processing power in increments of N.

Although the term "unprocessed" is being used to describe data packets 215, this is not to infer that no preprocessing has been applied to these packets (e.g., some degree of preprocessing may be executed within dataplane 165 of packet processing system 100); rather, the term "unprocessed" is being used to indicate that from the perspective of extensible processing pipeline 105, PEs 200 have not yet applied their processing function to unprocessed data packets 215.

Figure 3:
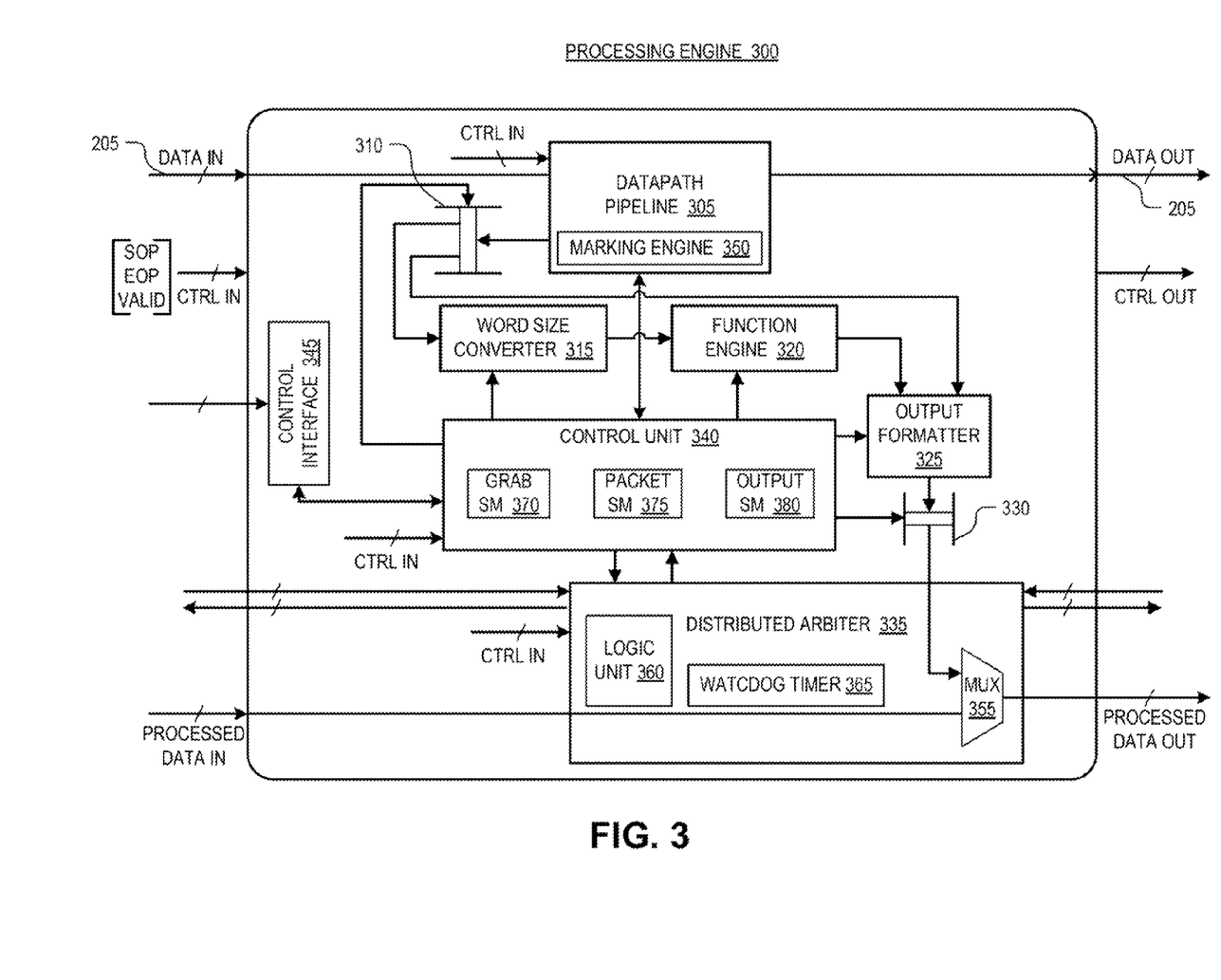
FIG. 3 is a functional block diagram of a serially linkable processing engine, in accordance with an embodiment of the invention.

FIG. 3 is a functional block diagram of a serially linkable processing engine 300, in accordance with an embodiment of the invention. Processing engine 300 is one possible implementation of PEs 200 illustrated in FIG. 2. The illustrated embodiment of PE 300 includes a datapath pipeline 305, an input buffer 310, a word size converter 315, a function engine 320, an output formatter 325, an output buffer 330, a distributed arbiter 335, a control unit 340, and a control interface 345. The illustrated embodiment of datapath pipeline 305 includes a marking engine 350. The illustrated embodiment of distributed arbiter 335 includes a multiplexer ("MUX") 355, logic unit 360, and a watchdog timer 365. The illustrated embodiment of control unit 325 includes a grab state machine ("SM") 370, a packet SM 375, and an output SM 380.

PE 300 can be implemented entirely in software or firmware, entirely in hardware (e.g., field programmable gate array, application specific integrated circuit, logic devices surface mounted on a circuit board, etc.), or implemented in a combination of software, firmware, and hardware. FIG. 3 illustrates the components of PE 300 in functional terms and is not intended to limit structure implementations. Accordingly, implementations of PE 300 may combine or separate the functional components in different manners than illustrated. For example, the state machines illustrated as internal to a single control unit 340 may be implemented as separate distinct components, combined into a single hybrid state machine, or even individual state machines may be implemented as a number of individual components.

Figure 4:
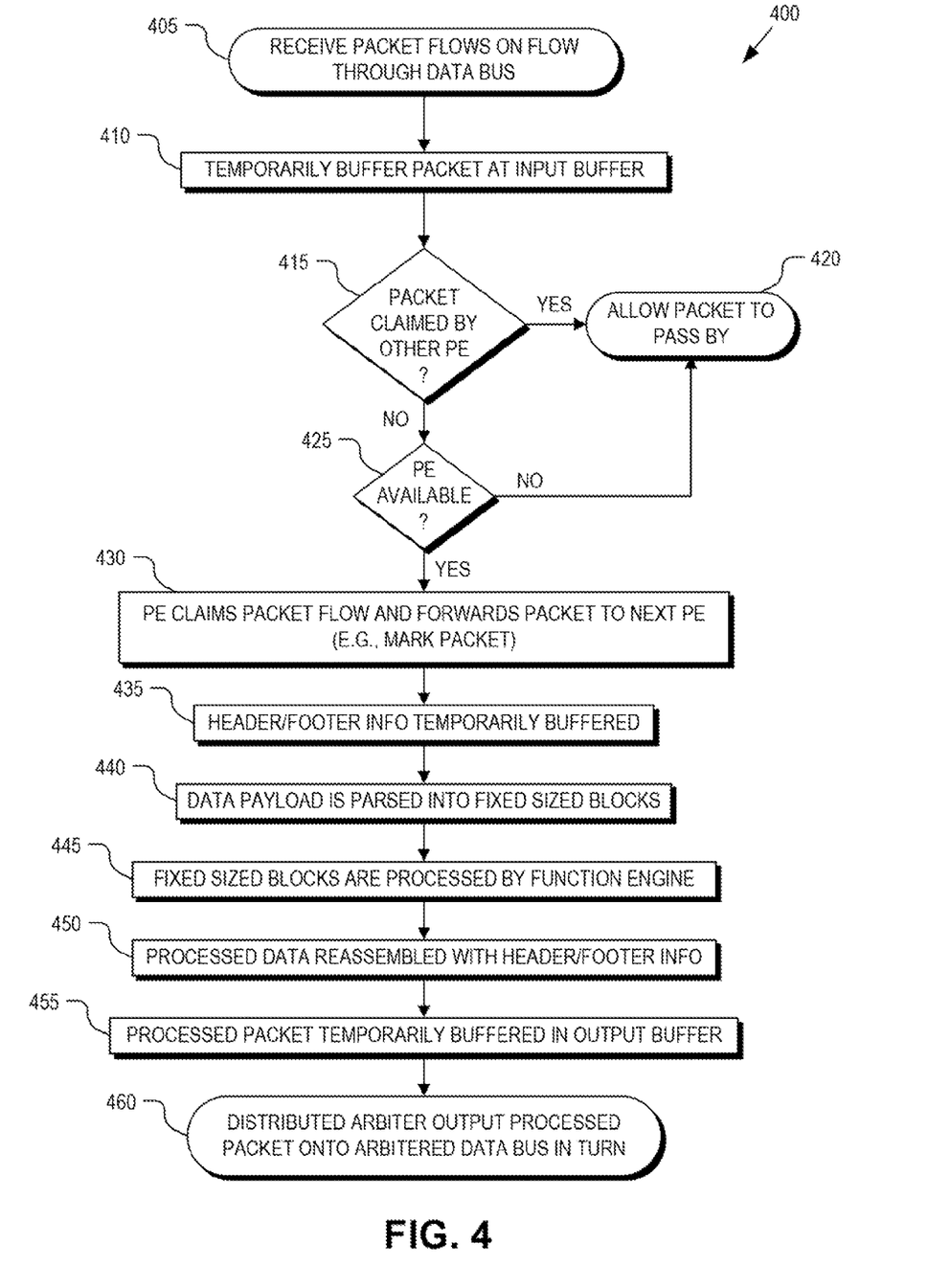
FIG. 4 is a flow chart illustrating a process of operation of a processing engine, which is a member of the extensible processing pipeline, in accordance with an embodiment of the invention.

FIG. 4 is a flow chart illustrating a process 400 of operation of PE 300, in accordance with an embodiment of the invention. The order in which some or all of the process blocks appear in process 400 should not be deemed limiting. Rather, one of ordinary skill in the art having the benefit of the present disclosure will understand that some of the process blocks may be executed in a variety of orders not illustrated.

In a process block 405, an unprocessed data packet 215 being the first in a new data packet flow arrives at DATA IN along flow through data bus 205. Datapath pipeline 305 receives the unprocessed data packet 215 and temporarily buffers a copy of the unprocessed data packet 215 into input buffer 310 (process block 410). In a decision block 415, marking engine 350 inspects the unprocessed packet to determine whether it belongs to a packet flow that has been claimed by another PE 200. In one embodiment, marking engine 350 inspects a flag field tagged onto the end of the unprocessed data packet 215 to determine if it has been set by another PE 200 indicating that another PE 200 has claimed the unprocessed data packet and its associated flow. If the flag is set, then datapath pipeline 305 passes the unprocessed data packet 215 without alteration to the next PE 200 out DATA OUT along flow through data bus 205 (process block 420). If the unprocessed data packet 215 is not claimed (decision block 415), but PE 300 is busy processing another packet flow or otherwise unavailable (decision block 425), then datapath pipeline 305 passes the unprocessed data packet 215 without alteration to the next PE 200 out DATA OUT along flow through data bus 205 (process block 420). However, if the unprocessed data packet 215 is not claimed (decision block 415) and PE 300 is available to claim a new packet flow (decision block 425), then process 400 continues to a process block 430.

In process block 430, PE 300 claims the unprocessed data packet and its associated flow and passes the claimed unprocessed data packet along. In one embodiment, marking engine 350 claims an unprocessed data packet by setting a flag field tagged onto an end of the packet. In some embodiments, only the first packet in a packet flow need be marked and claimed since subsequent packets, identifiable via a flow counter value within the header or footer of the packets, will be assumed to have already been claimed. After a packet flow has been claimed by marking engine 350, the subsequent packets in the flow may be identified by the PE 300 via various flow identifying indicia (e.g., 5-tuple header values including source address, destination address, source port, destination port, and transport protocol number). It is noteworthy that if an unprocessed data packet traverses the entire extensible processing pipeline 105 without being claimed due to a no available PEs 200, then the unclaimed may be continuously looped back through extensible processing pipeline 105 over flow through data bus 205 until it is claimed. In some implementations, it may be acceptable to lose some packet flows and as such an unclaimed first packet in a packet flow may result in the entire packet flow passing through unclaimed.

Marking engine 305 may mark unprocessed data packets 215 for other reasons in addition to claiming the packet. For example, marking engine 305 may also mark a given packet to indicate the type of processing that PE 300 intends to perform on the flow. Type marking permits different PEs 200 to perform different functions on a single packet flow.

In a process block 435, the buffered unprocessed data packet 215 is parsed to extract its data payload, header information, and footer information. In one embodiment, the header and footer information is temporarily stored within output formatter 325 to facilitate reassembly of a processed data packet. In a process block 44Q, the data payload of the unprocessed data packet is separated into fixed sized data blocks by word size converter 315 for delivery to function engine 320. The length of the fixed sized data blocks may vary depending upon the needs and operations performed by function engine 320. For example, fixed sized data blocks may be 8 bit words, 16 bit words, 32 bit words, 64 bit words, or otherwise. If operations performed by function engine 320 do not require a stream of fixed sized data blocks, then word size converter 315 may be disabled or even not included in some implementations.

In a process block 445, function engine 320 performs its processing function on the unprocessed data packet. Function engine 320 may be tailored to perform a variety of different packet processing functions. For example, function engine 320 may implement a decompression engine, such as the Deflate Decompressor described in U.S. application Ser. No. 12/729,816 entitled, "Deflate Decompressor" filed on Mar. 23, 2010, incorporated herein by reference. In other embodiments, function engine 320 may perform a variety of other DPA operations at line rates or near line rates.

After function engine 320 performs its processing function, the processed payload data is provided to output formatter 325, which combines the processed payload data with the buffered header and footer information to reassemble processed data packets 220 (process block 450). In some embodiments, output formatter 325 may recalculate header/footer fields, such as the CRC and the like. In some embodiments, processed data packets 220 may only include the processed payload data without header and/or footer information when only raw processed data is desired.

Once reassembled, the processed data packet 220 is temporarily buffered in output buffer 330 (process block 455) until distributed arbiter obtains write permission to access arbitered data bus 210. In a process block 460, the processed data packet 220 is output.

In one embodiment, control unit 340 coordinates the operation of the various components of processing engine 300 using a number of state machines to maintain state information between packets of a given packet flow while a given packet flow is being processed. In the illustrated embodiment, grab SM 370 takes care of looking for a new packet to process and grabbing them off flow through data bus 205. Control is passed from grab SM 370 to packet SM 375, which tells grab SM 370 whether to dump or process the current unprocessed data packet. Packet SM 375 controls the rest of the packet processing, passing control to the other state machines in choreographed order. Output SM 380 controls operation of output formatter 325 and output buffer 330 and indicates to distributed arbiter 335 when a processed data packet 220 is ready and waiting in output buffer 330. Control unit 340 receives control input signals including SOP, EOP, and VALID. The SOP and EOP signals indicate the start and end of packets while the VALID signal indicates when the data on flow through data bus 205 is valid and can be sampled.

Control interface 345 provides control signaling with each PE 300. In one embodiment, control interface 345 may also be used to send/receive flow control signaling (e.g., ACK, NAK signaling) with dataplane 165 or another data source. In one embodiment, control interface 345 also provides a user interface for programming, repurposing, monitoring, and/or resetting the components of PE 300.

Figure 5:
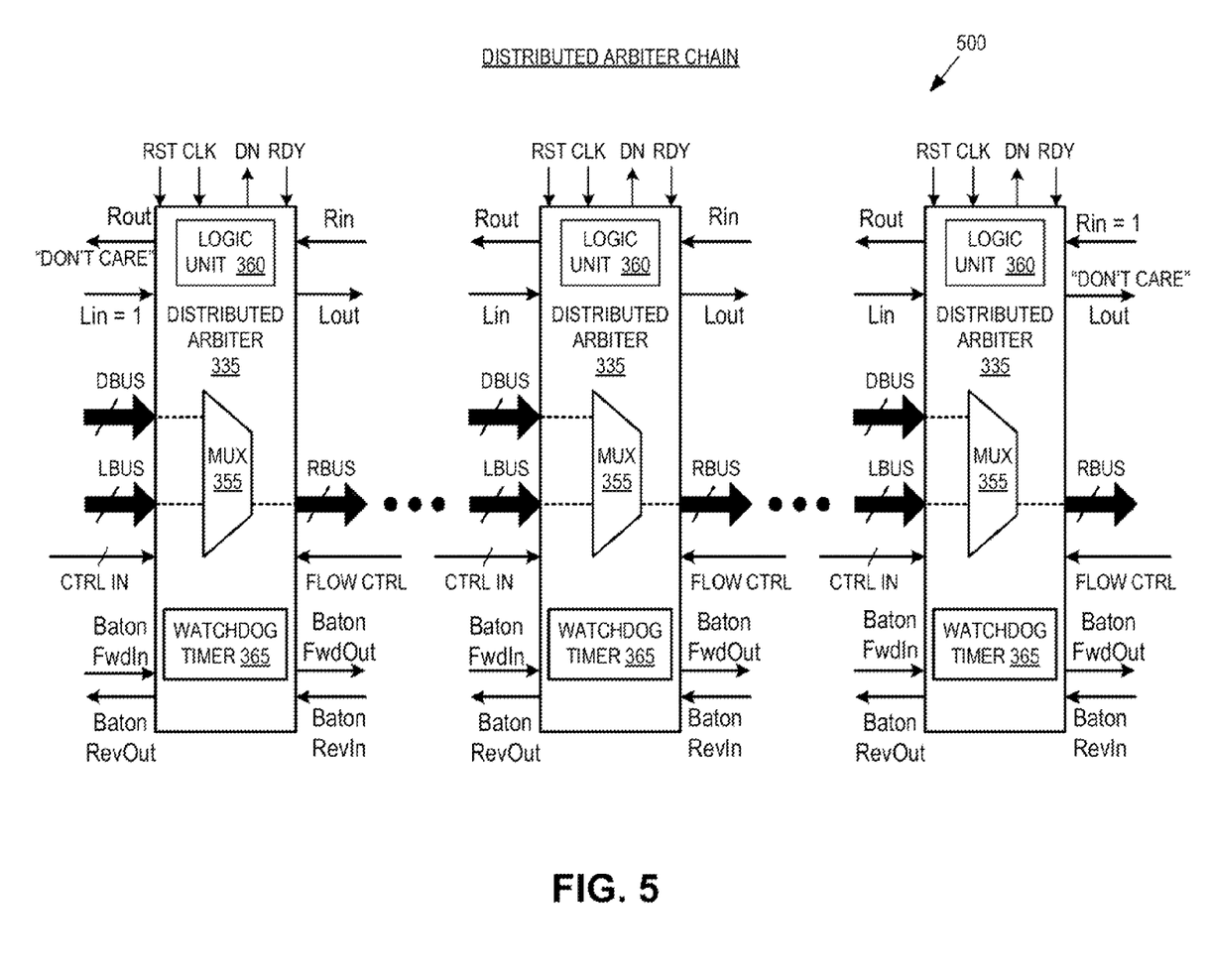
FIG. 5 is a functional block diagram of a distributed arbiter chain, in accordance with an embodiment of the invention.

FIG. 5 is a functional block diagram of a distributed arbiter chain 500, in accordance with an embodiment of the invention. Distributed arbiter chain 500 illustrates the communication signaling between the distributed arbiters 335 within each instance of PE 300 (or each PE 200 within extensible processing pipeline 105). Each distributed arbiter 335 includes identify ports (Rout, Rin, Lin, and Lout) coupled to indicate to a given distributed arbiter 335 its relative position (e.g., leftmost, rightmost, intermediate) within chain 500. The leftmost distributed arbiter 335 has its Lin port coupled to a logic value (e.g., Lin='1'), the rightmost distributed arbiter 335 has its Rin port coupled to a logic value (e.g., Rin='1'), and the intermediate distributed arbiters 335 have their Rin, Rout, Lin, and Lout ports coupled to adjacent distributed arbiters 335 as illustrated. In this manner, arbitered data bus 210 can be shared by an increasing number of PEs 200 simply by chaining additional distributed arbiters 335.

Virtual baton ports (Baton_fwd_in, Baton_fwd_out, Baton_rev_in, Baton_rev_out) link together to provide forward and reverse baton paths for passing a virtual baton. While a given PE 200 holds the virtual baton, it is granted write permission to arbiter data bus 210. The baton is sequentially passed forward along the forward path (Baton_fwd_in, Baton_fwd_out) from the leftmost distributed arbiter 335 to the rightmost distributed arbiter 335 and then back along the reverse path (Baton_rev_in, Baton_rev_out) from rightmost distributed arbiter 335 to the leftmost distributed arbiter 335. With each pass of the virtual baton, watchdog timer 365 is set to ensure no PE 200 can monopolize arbitered data bus 210. If watchdog timer 365 expires while a given distributed arbiter 335 is holding the virtual baton, it is forced to relinquish the virtual baton to its next neighbor.

The illustrated embodiments of distributed arbiters 335 each include a logic unit 360 for performing decentralized decisions for time sharing arbitered data bus 210. MUX 355 permits each distributed arbiter to either pass along processed data packets 220 received on the LBUS port from a previous PE 200 or to write processed data packets 220 to arbitered data bus 210 via the DBUS port. The DBUS port is coupled to receive a processed data packet from output buffer 330 while the LBUS port is linked to the RBUS port of a PE 200 to the left of a given PE 200.

Figure 6:
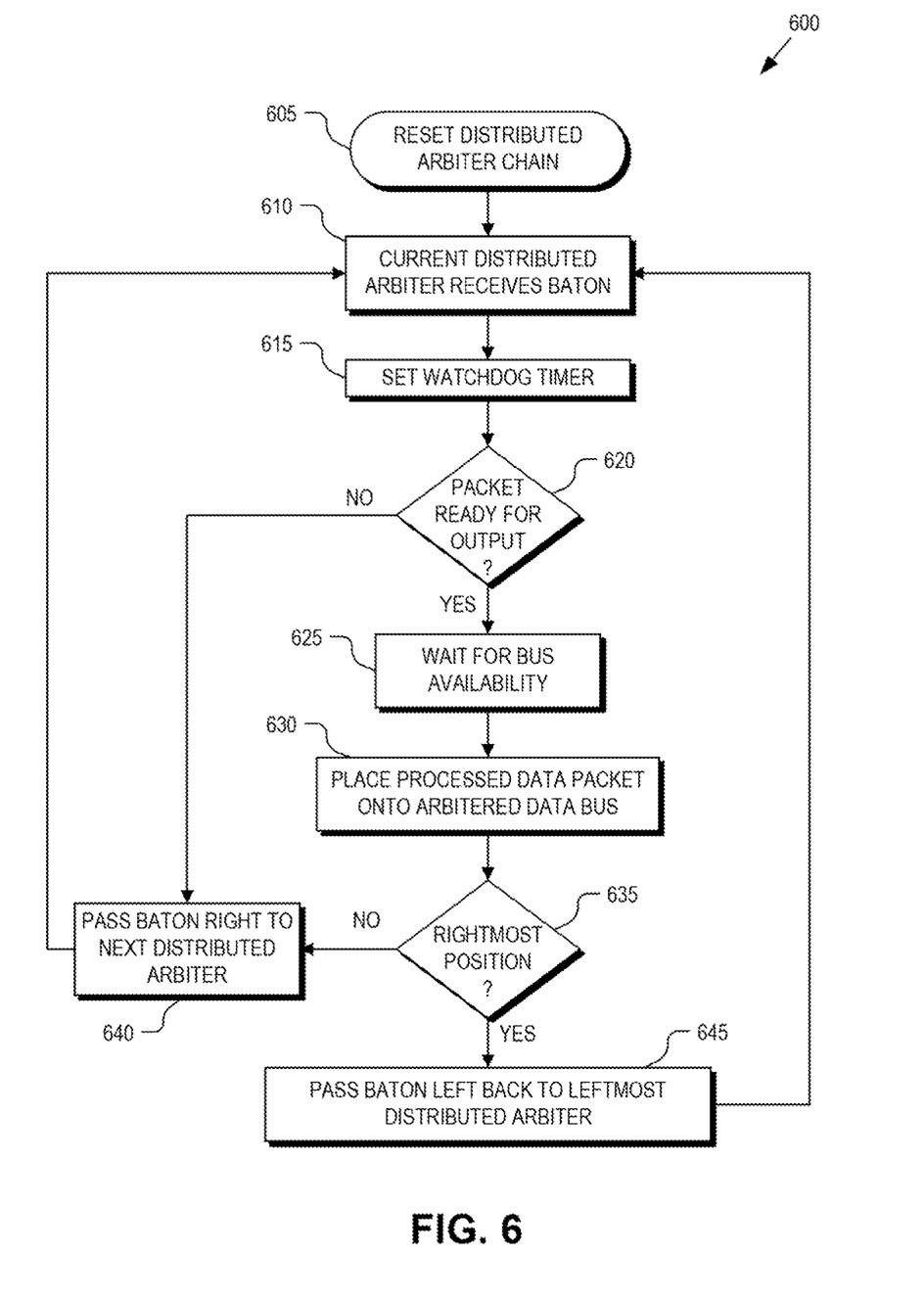
FIG. 6 is a flow chart illustrating a process of operation of the distributed arbiter chain, in accordance with an embodiment of the invention.

FIG. 6 is a flow chart illustrating a process 600 for operation of distributed arbiter chain 500, in accordance with an embodiment of the invention. The order in which some or all of the process blocks appear in process 600 should not be deemed limiting. Rather, one of ordinary skill in the art having the benefit of the present disclosure will understand that some of the process blocks may be executed in a variety of orders not illustrated.

In a process block 605, distributed arbiter chain 500 is reset via assertion of a reset signal (RST). In one embodiment, control unit 340 issues RST. In response to RST, the leftmost distributed arbiter 335 is given the virtual baton and becomes the current distributed arbiter (process block 610). In a process block 615, the current distributed arbiter sets its watchdog timer 365. If at any time during possession of the virtual baton, watchdog timer 365 expires, then the virtual baton is released to the next distributed arbiter 335 in the sequence.

If the current PE 200 has a processed data packet 220 stored in output buffer 330 and ready for output (decision block 620), then logic unit 360 will wait for bus availability (process block 625) before placing the processed data packet 220 onto arbitered data bus 210 (process block 630). In one embodiment, logic unit 360 determines that a processed data packet 220 is ready and waiting via receipt of a packet ready signal (RDY). In one embodiment, waiting for bus availability includes receiving a flow control signal (FLOW CTRL) from the receiving device (e.g., dataplane 165 or additional processing block 175) indicating readiness to accept output data. In one embodiment, once a processed data packet 220 has been output on arbitered data bus 210, logic unit 360 asserts a done signal (DN) to control unit 340. Returning to decision block 620, if the current PE 200 does not have a processed data packet 220 ready for output, then the virtual baton is passed to the next distributed arbiter 335 in the sequence (process block 640). When a given distributed arbiter 335 is not holding the virtual baton, its MUX 355 connects its LBUS port to its RBUS port.

Once the virtual baton is passed all the way to the rightmost distributed arbiter 335 in the chain (decision block 635), the virtual baton is passed backwards along a reverse path (BatonRevIn and BatonRevOut) back to the leftmost distributed arbiter 335 (process block 645) and process 600 repeats from process block 610. By using both a forward baton path and a reverse baton path (as opposed to linking an output of the last distributed arbiter 335 to the input of the first distributed arbiter 335), an unlimited number of distributed arbiters 335 can be linked in a series chain without having to route signal lines between the first and last PEs 200.

The processes explained above are described in terms of computer software and hardware. The techniques described may constitute machine-executable instructions embodied within a machine (e.g., computer) readable storage medium, that when executed by a machine will cause the machine to perform the operations described. Additionally, the processes may be embodied within hardware, such as an application specific integrated circuit ("ASIC") or the like.

A computer-readable storage medium includes any mechanism that provides (e.g., stores) information in a form accessible by a machine (e.g., a computer, network device, personal digital assistant, manufacturing tool, any device with a set of one or more processors, etc.). For example, a computer-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An extensible processing pipeline, comprising:
   a plurality of processing engines each including a function engine and a marking engine to process packets associated with packet flows, wherein for a given processing engine the function engine is coupled to perform a processing function on a given packet flow and the marking engine is coupled to mark at least one packet of the given packet flow to indicate to other processing engines that the given packet flow is claimed by the given processing engine for processing by the function engine of the given processing engine;
   a flow through data bus coupling the processing engines in series such that the packets are received on the flow through data bus and flow sequentially through each of the processing engines over the flow through data bus; and
   an arbitered data bus linking the processing engines for outputting processed packets after the packets are processed by the function engines,
   wherein the flow through data bus is coupled to sequentially communicate each of the packets that are unprocessed by the function engines to all of the processing engines but is not coupled to communicate processed results generated by the function engines,
   wherein the marking engines are coupled to selectively mark the packets that are unprocessed by the function engines and transmitted along the flow through data bus.

2. The extensible processing pipeline of claim 1, wherein each of the processing engines further includes:

a distributed arbiter coupled to the arbitered data bus and including logic to perform decentralized decisions for time sharing the arbitered data bus between the processing engines.

3. The extensible processing pipeline of claim 2, wherein each of the processing engines further includes an input buffer, an output formatter, and an output buffer, wherein for the given processing engine:
the input buffer is coupled to temporarily buffer each of the packets as the packets flow along the flow through data bus;
the output formatter is coupled to reassemble the packets of the given packet flow into the processed packets of the given packet flow after processing by the function engine; and
the output buffer is coupled to temporarily buffer the processed packets of the given packet flow prior to output on the arbitered data bus.

4. The extensible processing pipeline of claim 3, wherein each of the processing engines further includes a word size converter coupled between the input buffer and the function engine, wherein for the given processing engine the word size converter parses the packets of the given packet flow into fixed size data blocks for sequential delivery to the function engine.

5. The extensible processing pipeline of claim 4, wherein each of the processing engines further includes a control unit, wherein for the given processing engine the control unit is coupled to coordinate operation of the marking engine, the function engine, the output formatter, and the distributed arbiter and to maintain state information between the packets of the given packet flow while the given packet flow is being processed.

6. The extensible processing pipeline of claim 3, wherein each of the distributed arbiters further includes:
a multiplexor having an output, a first input coupled to the output buffer, and a second input coupled to the output of the multiplexor in a previous one of the processing engines coupled in series.

7. The extensible processing pipeline of claim 2, wherein each of the distributed arbiters includes identity ports, wherein for a given distributed arbiter the identify ports are selectively coupled either to one or two adjacent distributed arbiters or to a logic value, the identify ports indicating to the given distributed arbiter whether the given distributed arbiter is a first, a last, or an intermediate arbiter in a chain of distributed arbiters.

8. The extensible processing pipeline of claim 7, wherein each of the distributed arbiters further includes baton paths for passing a virtual baton sequentially in forward and reverse directions through the chain of distributed arbiters, the virtual baton indicating which of the distributed arbiters has write access to the arbitered data bus.

9. The extensible processing pipeline of claim 8, wherein each of the distributed arbiters further includes a watchdog timer, wherein for the given distributed arbiter the watchdog timer is set upon receiving the virtual baton and forces release of the arbitered data bus should the watchdog timer expire before passing the virtual baton.

10. The extensible processing pipeline of claim 1, wherein the function engine comprises a decompression engine for expanding compressed data within the data packets.

11. A method of distributed packet processing, the method comprising:

sequentially passing packets associated with packet flows between a plurality of processing engines along a flow through data bus linking the plurality of processing engines in series;
marking at least one packet within a given packet flow at a given processing engine to signify by the given processing engine to other processing engines that the given processing engine has claimed the given packet flow for processing;
applying a processing function to the packet flows by the processing engines to generate processed packets; and
time sharing an arbitered data bus among the processing engines to output the processed packets from the processing engines after applying the processing function to the packets,
wherein the flow through data bus sequentially communicates each of the packets that do not have the processing function applied by the processing engines to all the processing engines and communicates those of the packets that are marked but does not communicate the processed packets,
wherein the at least one packet that is marked is unprocessed by the processing function.

12. The method of claim 11, further comprising:
marking the at least one packet to indicate a type of processing function to be applied to the given packet flow at the given processing engine.

13. The method of claim 11, wherein the plurality of processing engines comprises an extensible processing pipeline capable of having N processing engines linked in series to execute a processing function on N packet flows in parallel.

14. The method of claim 13, wherein the processing function comprises packet data decompression such that the processed packets are larger than the packets.

15. The method of claim 14, wherein the packet data decompression comprises deflate decompression.

16. The method of claim 13, wherein time sharing the arbitered data bus comprises executing decentralized, distributed decisions at each of the processing engines for sharing the arbitered bus.

17. The method of claim 16, further comprising:
determining a relative position for each of the processing engines, wherein the relative position includes one of a first position, a last position, or an intermediate position.

18. The method of claim 17, wherein time sharing the arbitered data bus among the processing engines further comprises:
passing a virtual baton along a forward path from the first position to the last position; and
passing the virtual baton along a reverse path form the last position to the first position, wherein the virtual baton indicates which of the processing engines has write privileges to the arbitered data bus at a given time.

19. The method of claim 18, further comprising:
setting a watchdog timer upon receipt of the virtual baton at the given processing engine;
forcing release of the virtual baton if the given processing engine fails to pass along the virtual baton prior to expiration of the watchdog timer.

20. The method of claim 11, further comprising:
temporarily buffering the packets within each of the processing engines as the packets sequentially pass along the flow through data bus;
inspecting a flag field within the packets at each processing engine to determine whether a given packet has been claimed for processing by another one of the processing engines;

passing the given packet along unmodified if the given packet is claimed by another one of the processing engines or if the given packet is unclaimed and the given processing engine is currently processing a different packet flow; and marking the given packet as claimed and passing the given packet to a next one of the processing engines, if the given packet is unclaimed and the given processing engine is available.

21. The extensible processing pipeline of claim 1, wherein the marking engines are not coupled to mark the processed packets output to the arbitered data bus.

* * * * *